United States Patent
Xiong et al.

(10) Patent No.: US 11,615,594 B2
(45) Date of Patent: Mar. 28, 2023

(54) SYSTEMS AND METHODS FOR RECONSTRUCTION OF DENSE DEPTH MAPS

(71) Applicant: Samsung Electronics Company, Ltd., Suwon si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/338,521

(22) Filed: Jun. 3, 2021

(65) Prior Publication Data

US 2022/0230397 A1    Jul. 21, 2022

Related U.S. Application Data

(60) Provisional application No. 63/140,155, filed on Jan. 21, 2021.

(51) Int. Cl.
*G06T 19/00*        (2011.01)
*G06T 7/55*         (2017.01)

(52) U.S. Cl.
CPC .............. *G06T 19/006* (2013.01); *G06T 7/55* (2017.01); *G06T 2207/10028* (2013.01)

(58) Field of Classification Search
CPC .................... G06T 19/006; G06T 7/55; G06T 2207/10028; G06T 7/50; G06T 2207/10024; G06T 2207/30244; G06T 7/12; G06T 2207/10016; G06T 5/005;

(Continued)

(56) References Cited

U.S. PATENT DOCUMENTS

| 8,737,769 B2 | 5/2014 | Finch |
| 9,443,355 B2 | 9/2016 | Chan |
| 10,326,500 B1 | 6/2019 | Qu |

(Continued)

FOREIGN PATENT DOCUMENTS

| CN | 110738731 | 1/2020 |
| CN | 111563923 | 11/2020 |

(Continued)

OTHER PUBLICATIONS

U.S. Appl. No. 16/942,627, filed Jul. 29, 2020, Peri.

(Continued)

*Primary Examiner* — Jeffery A Brier

(57) ABSTRACT

A method by an extended reality (XR) display device includes accessing image data and sparse depth points corresponding to a plurality of image frames to be displayed on one or more displays of the XR display device. The method further includes determining a plurality of sets of feature points for a current image frame of the plurality of image frames, constructing a cost function configured to propagate the sparse depth points corresponding to the current image frame based on the plurality of sets of feature points, and generating a dense depth map corresponding to the current image frame based on an evaluation of the cost function. The method thus includes rendering the current image frame on the one or more displays of the XR display device based on the dense depth map.

20 Claims, 8 Drawing Sheets

(58) Field of Classification Search
CPC .......... G06F 3/011; G06F 7/269; G06F 5/002; G06F 7/13; G06F 19/00
See application file for complete search history.

(56) References Cited

U.S. PATENT DOCUMENTS

| | | | |
|---|---|---|---|
| 10,965,929 | B1 | 3/2021 | Bellows |
| 11,032,530 | B1* | 6/2021 | Bleyer ................. H04N 13/332 |
| 11,288,543 | B1 | 3/2022 | Tovchigrechko |
| 2003/0091225 | A1 | 5/2003 | Chen |
| 2007/0024614 | A1 | 2/2007 | Tam |
| 2007/0146232 | A1* | 6/2007 | Redert ...................... G06T 7/50 |
| | | | 382/285 |
| 2011/0249122 | A1 | 10/2011 | Tricoukes |
| 2012/0134597 | A1 | 5/2012 | Finch |
| 2015/0235447 | A1 | 8/2015 | Abovitz |
| 2016/0248995 | A1 | 8/2016 | Mullins |
| 2016/0267717 | A1 | 9/2016 | Bar-Zeev |
| 2017/0084074 | A1 | 3/2017 | Hwang |
| 2017/0294021 | A1 | 10/2017 | Khan |
| 2018/0063511 | A1 | 3/2018 | Paik |
| 2018/0089901 | A1 | 3/2018 | Rober |
| 2018/0234669 | A1 | 8/2018 | Chen |
| 2018/0276885 | A1 | 9/2018 | Singh |
| 2018/0278918 | A1 | 9/2018 | Peri |
| 2019/0041976 | A1 | 2/2019 | Veeramani |
| 2019/0228504 | A1 | 7/2019 | Tong |
| 2019/0244413 | A1 | 8/2019 | Smith |
| 2019/0333263 | A1 | 10/2019 | Melkote Krishnaprasad |
| 2020/0082554 | A1 | 3/2020 | Wang |
| 2020/0098186 | A1 | 3/2020 | Xue |
| 2020/0193623 | A1 | 6/2020 | Liu |
| 2020/0260029 | A1* | 8/2020 | Kang et al. .......... H04N 13/246 |
| 2020/0273190 | A1 | 8/2020 | Ye |
| 2020/0394452 | A1 | 12/2020 | Ma |
| 2020/0394848 | A1 | 12/2020 | Choudhary |
| 2020/0410766 | A1 | 12/2020 | Swaminathan |
| 2021/0004979 | A1 | 1/2021 | Valentin |
| 2021/0134048 | A1 | 5/2021 | Weng |
| 2021/0209859 | A1 | 7/2021 | Miranda |
| 2021/0279949 | A1 | 9/2021 | Cao |
| 2021/0319569 | A1 | 10/2021 | Peri |
| 2021/0398306 | A1 | 12/2021 | Bleyer |

FOREIGN PATENT DOCUMENTS

| | | | |
|---|---|---|---|
| EP | 3699736 | A1 | 8/2020 |
| EP | 3349176 | B1 | 12/2021 |
| IN | 201821033606 | A * | 3/2020 |
| JP | 020-061187 | | 4/2020 |
| KR | 20100034789 | | 4/2010 |
| KR | 20100062360 | | 6/2010 |
| KR | 1290197 | | 7/2013 |
| KR | 20140007367 | A | 1/2014 |
| KR | 20170018930 | | 2/2017 |
| KR | 20170029365 | A * | 3/2017 |
| KR | 1020170023110 | | 3/2017 |
| KR | 1020180066551 | | 6/2018 |

OTHER PUBLICATIONS

U.S. Appl. No. 17/198,997, filed Mar. 11, 2021, Peri.

Badias, Alberto, Iciar Alfaro, David González, Francisco Chinesta, and Elias Cueto. "Reduced order modeling for physically-based augmented reality." *Computer Methods in Applied Mechanics and Engineering* 341 (2018): 53-70.

PCT Search Report and written opinion in PCT/KR2022/001084 dated May 4, 2022.

Fangchang Ma et al., 'Sparse-to-Dense: Depth Prediction from Sparse Depth Samples and a Single Image', arXiv:1709.07492vl, pp. 1-8, 21, dated Sep. 2017.

Sung-Hoon Im et al., 'Depth From Accidental Motion Using Geometry Prior', 2015 IEEE International Conference on Image Processing (ICIP), pp. 4160-4164, dated Sep. 2015.

Lam Huynh et al., 'Boosting Monocular Depth Estimation with Lightweight 3D Point Fusion', arXiv:2012.10296vl, pp. 1-10, 18, dated Dec. 2020.

International Search Report and Written Opinion for Application No. PCT/KR2021/013997 (8 pages) dated Jan. 25, 2022.

Non-Final Office Action in U.S. Appl. No. 17/198,997, dated Feb. 9, 2022.

Final Office Action in U.S. Appl. No. 17/198,997, dated Jul. 19, 2022.

Non-Final Office Action in U.S. Appl. No. 17/198,997, dated Nov. 7, 2022.

Notice of Allowance in U.S. Appl. No. 17/198,997, dated Feb. 15, 2023.

* cited by examiner

SYSTEMS AND METHODS FOR RECONSTRUCTION OF DENSE DEPTH MAPS

PRIORITY

This application claims the benefit under 35 U.S.C. § 119(e) of U.S. Provisional Patent Application No. 63/140,155, filed 21 Jan. 2021, which is incorporated herein by reference.

TECHNICAL FIELD

This disclosure relates generally to database and file management within network environments, and in particular relates to dense depth maps for extended reality (XR) systems.

BACKGROUND

An extended reality (XR) system may generally include a computer-generated environment and/or a real-world environment that includes at least some XR artifacts. Such an XR system or world and associated XR artifacts typically include various applications (e.g., video games, e-commerce, social media, videoconferencing, messaging, and so forth), which may allow users to utilize these XR artifacts by manipulating their presence in the form of a computer-generated representation (e.g., avatar). In typical XR systems, image data may be rendered on, for example, a robust head-mounted display (HMD) that may be coupled through a physical wired or wireless connection to a base graphics generation device or cloud based service responsible for generating the image data.

However, in some instances, in which the HMD includes, for example, lightweight XR glasses or spectacles as opposed to more robust headset devices, the XR glasses or spectacles may, in comparison, include reduced processing power, low-resolution/low-cost cameras, and/or relatively simple tracking optics. Additionally, due to the smaller architectural area, the XR glasses or spectacles may also include reduced power management (e.g., batteries, battery size) and thermal management (e.g., cooling fans, heat sinks) electronics. This may often preclude such devices from maximizing performance while reducing power consumption. For instance, certain lightweight XR systems may re-project 3D renderings in which the edges or boundaries of certain objects include blurred or washed out pixels. This may prevent the lightweight XR system from accurately reconstructing and re-projecting 3D scenes and objects (e.g., 3D scene reconstruction and comprehension). It may be thus useful to provide techniques to improve lightweight XR systems.

DESCRIPTION OF EXAMPLE EMBODIMENTS

Figure 1:
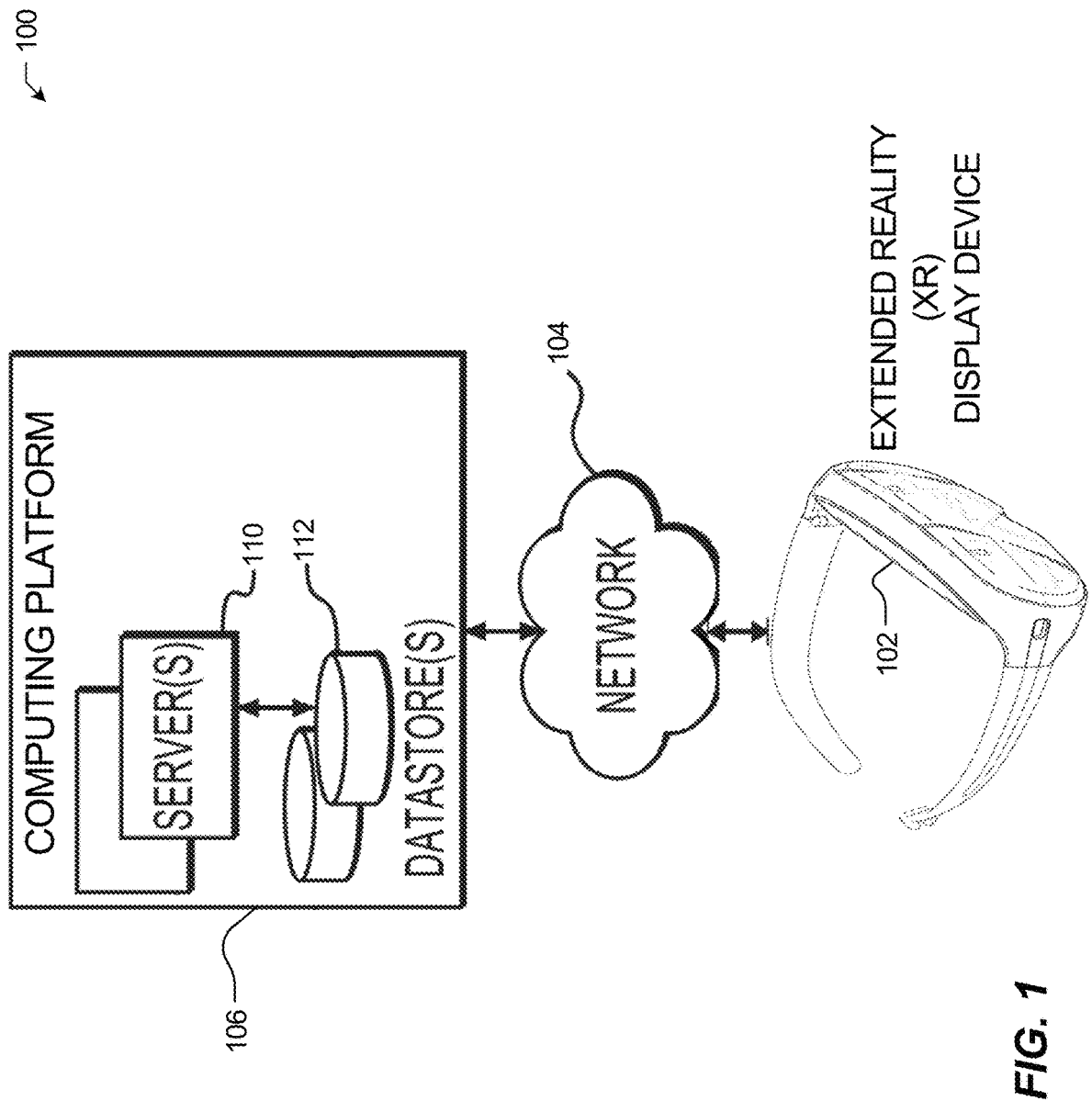
FIG. 1 illustrates an example extended reality (XR) system.

The present embodiments are directed toward techniques for reconstructing dense depth maps based on sparse depth points and corresponding image frames that may be utilized to improve 3D scene reconstruction and comprehension capabilities of extended reality (XR) display devices. In particular embodiments, an XR display device may access image data and sparse depth points corresponding to a plurality of image frames to be displayed on one or more displays of the XR display device. In particular embodiments, the XR display device may then determine a plurality of sets of feature points for a current image frame of the plurality of image frames. For example, in particular embodiments, the plurality of sets of feature points may include one or more of a set of static object feature points, a set of static edge feature points, a set of static object contour points, a set of dynamic object feature points, a set of dynamic edge feature points, or a set of dynamic object contour points.

In particular embodiments, XR display device may then construct a cost function configured to propagate the sparse depth points corresponding to the current image frame based on the plurality of sets of feature points. For example, in particular embodiments, prior to constructing the cost function, the XR display device may determine one or more weights respectively corresponding to the plurality of sets of feature points. In particular embodiments, the XR display device may constructing the cost function based on the determined one or more weights, the sparse depth points, and a depth coherence between neighboring image frames with respect to the plurality of image frames. For example, in particular embodiments, the depth coherence between neighboring image frames with respect to the plurality of image frames is determined based on a dense depth map corresponding to a previous image frame of the plurality of image frames, in which the previous image frame was previously displayed on the display of the XR display device. In particular embodiments, the XR display device may then generate a dense depth map corresponding to the current image frame based on an evaluation of the cost function. For example, in particular embodiments, the dense depth map may be generated utilizing one or more linear solvers to determine depth points corresponding to each of a plurality of pixels of the current image frame. For example, in particular embodiments, the one or more linear solvers may include one or more of a full multigrid (FMG) solver, a geometric multigrid (GMG) solver, or an algebraic multigrid (AMG) solver.

In this way, the present techniques for reconstructing dense depth maps based on sparse depth points and corresponding image frames for providing improved 3D scene reconstruction and comprehension in XR display devices may improve the users' overall experience in utilizing XR display devices and XR applications. Indeed, by providing the dense depth maps based on sparse depth points and corresponding image frames, the processing times for depth map reconstruction may be reduced and the accuracy and precision of depth map reconstruction (e.g., with respect to improving smoothness and perceptibility of re-projected 3D objects, 3D object boundaries, 3D object edges, 3D object contours, and so forth) may be improved so as to be more suitable for 3D scene reconstruction and comprehension in XR applications.

As used herein, "extended reality" may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. For example, "extended reality" content may include completely computer-generated content or partially computer-generated content combined with captured content (e.g., real-world images). In some embodiments, the "extended reality" content may also include video, audio, haptic feedback, or some combination thereof, any of which may be presented in a single channel or in multiple channels (such as stereo video that produces a three-dimensional (3D) effect to the viewer). Further, as used herein, it should be appreciated that "extended reality" may be associated with applications, products, accessories, services, or a combination thereof, that, for example, may be utilized to create content in extended reality and/or utilized in (e.g., perform activities) in extended reality. Thus, "extended reality" content may be implemented on various platforms, including a head-mounted device (HMD) connected to a host computer system, a standalone HMD, a mobile device or computing system, or any other hardware platform capable of providing extended reality content to one or more viewers.

Furthermore, as used herein, a "current image frame" may refer to a most recent image frame or a most recent set of image frames that may be either sent (e.g., pushed) to an XR display device from a computing platform or requested or loaded (e.g., pulled) from the computing platform by the XR display device for image or depth processing and analysis. For example, in particular embodiments, the "current image frame" may simply correspond to the latest image frame (of an N set of RGB-D image frames being rendered by the computing platform) that may be pushed to, or pulled by, the XR display device. That is, all of the image frames of the N set of RGB-D image frames may not be provided from the computing platform to the XR display device, and thus the "current image frame" may simply refer to the most recent image that is indeed sent from the computing platform to the XR display device. Lastly, as used herein, a "previous image frame" may refer to a penultimate most recent image frame or a penultimate most recent set of image frames that may have been either previously sent (e.g., pushed) to an XR display device from a computing platform or previously requested or loaded (e.g., pulled) from the computing platform by the XR display device for image or depth processing, analysis, and RGB-D re-projection. For example, in particular embodiments, the "previous image frame" may simply correspond to the penultimate image frame (of an N set of RGB-D image frames being rendered by the computing platform) that may have been pushed to, or pulled by, the XR display device.

FIG. 1 illustrates an example extended reality (XR) system 100 that may be suitable for reconstructing dense depth maps based on sparse depth points and corresponding image frames for providing improved 3D scene reconstruction and comprehension, in accordance with presently disclosed embodiments. In particular embodiments, the XR system 100 may include an XR display device 102, a network 104, and a computing device 106. In particular embodiments, a user may wear the XR display device 102 that may display visual extended reality content to the user. The XR display device 102 may include an audio device that may provide audio extended reality content to the user. In particular embodiments, the XR display device 102 may include one or more cameras which can capture images and videos of environments. The XR display device 102 may include an eye tracking system to determine the vergence distance of the user. In particular embodiments, the XR display device 102 may include a lightweight head-mounted display (HMD) (e.g., goggles, eyeglasses, spectacles, a visor, and so forth). In particular embodiments, the XR display device 102 may also include a non-HMD device, such as a lightweight handheld display device or one or more laser projecting spectacles (e.g., spectacles that may project a low-powered laser onto a user's retina to project and display image or depth content to the user). In particular embodiments, the network 104 may include, for example, any of various wireless communications networks (e.g., WLAN, WAN, PAN, cellular, WMN, WiMAX, GAN, 6LowPAN, and so forth) that may be suitable for communicatively coupling the XR display device 102 to the computing device 106.

In particular embodiments, the computing device 106 may include, for example, a standalone host computing system, an on-board computer system integrated with the XR display device 102, a mobile device, or any other hardware platform that may be capable of providing extended reality content to the XR display device 102. In particular embodiments, the computing device 106 may include, for example, a cloud-based computing architecture (including one or more servers 108 and data stores 110) suitable for hosting and servicing XR applications or experiences executing on the XR display device 102. For example, in particular embodiments, the computing device 106 may include a Platform as a Service (PaaS) architecture, a Software as a Service (SaaS) architecture, and an Infrastructure as a Service (IaaS), or other similar cloud-based computing architecture. As it may be appreciated, in particular embodiments in which the XR display device 102 includes lightweight devices, such as goggles, eyeglasses, spectacles, a visor, and so forth, the XR display device 102 may, due to the smaller architectural area, include reduced power management (e.g., batteries, battery size) and thermal management (e.g., cooling fans, heat sinks, and so forth) electronics.

Figure 2A:
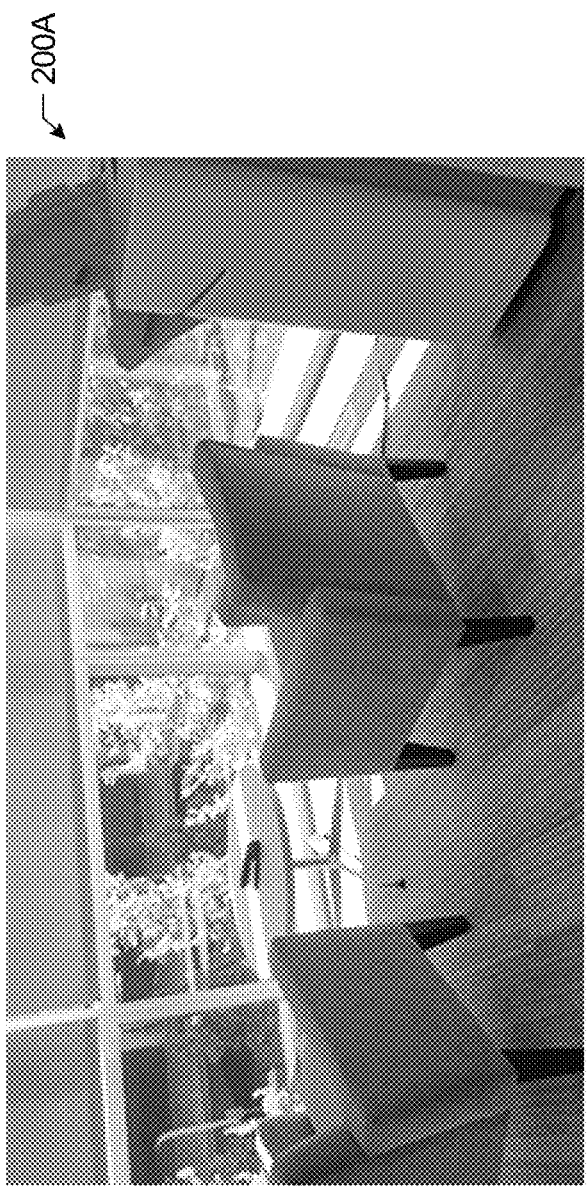
FIGS. 2A and 2B illustrate an example real-world scene and an example depth map of the real-world scene, respectively.
Figure 2B:

FIGS. 2A and 2B illustrate an example real-world scene 200A (e.g., indoor office room) and an example depth map 200B of the real-world scene (e.g., indoor office room), respectively. As illustrated by FIG. 2A, the real-world scene 200A may include objects (e.g., table, seating chairs, and so forth). However, as illustrated by FIG. 2B, the 3D objects (e.g., as generally highlighted by the dashed circle 202) of the depth map 200B may be rendered with the pixels corresponding to the boundaries and edges of the objects (e.g., seating chairs, table) appearing blurred or washed out. As may be appreciated, because the depth map 200B may be rendered with the pixels corresponding to the boundaries and edges of the 3D objects (e.g., seating chairs, table) appearing blurred or washed out, a user wearing the XR display device 102 may not be able to perceive and determine the respective 3D objects themselves or the locations of the respective 3D objects within the real-world scene 200A. This may further preclude XR artifacts that may be rendered on the respective 3D objects (e.g., seating chairs, table, and so forth) of the depth map 200B of the real-world scene from appearing desirably and appropriately perceptible to the user, and would thus reduce the efficacy of the overall XR experience of the user. Thus, as will be further appreciated with respect to FIGS. 3-7, the present embodiments are directed toward techniques for reconstructing dense depth maps based on sparse depth points and corresponding image frames that may be utilized to improve 3D scene reconstruction and comprehension capability of the XR display device 102.

Figure 3:
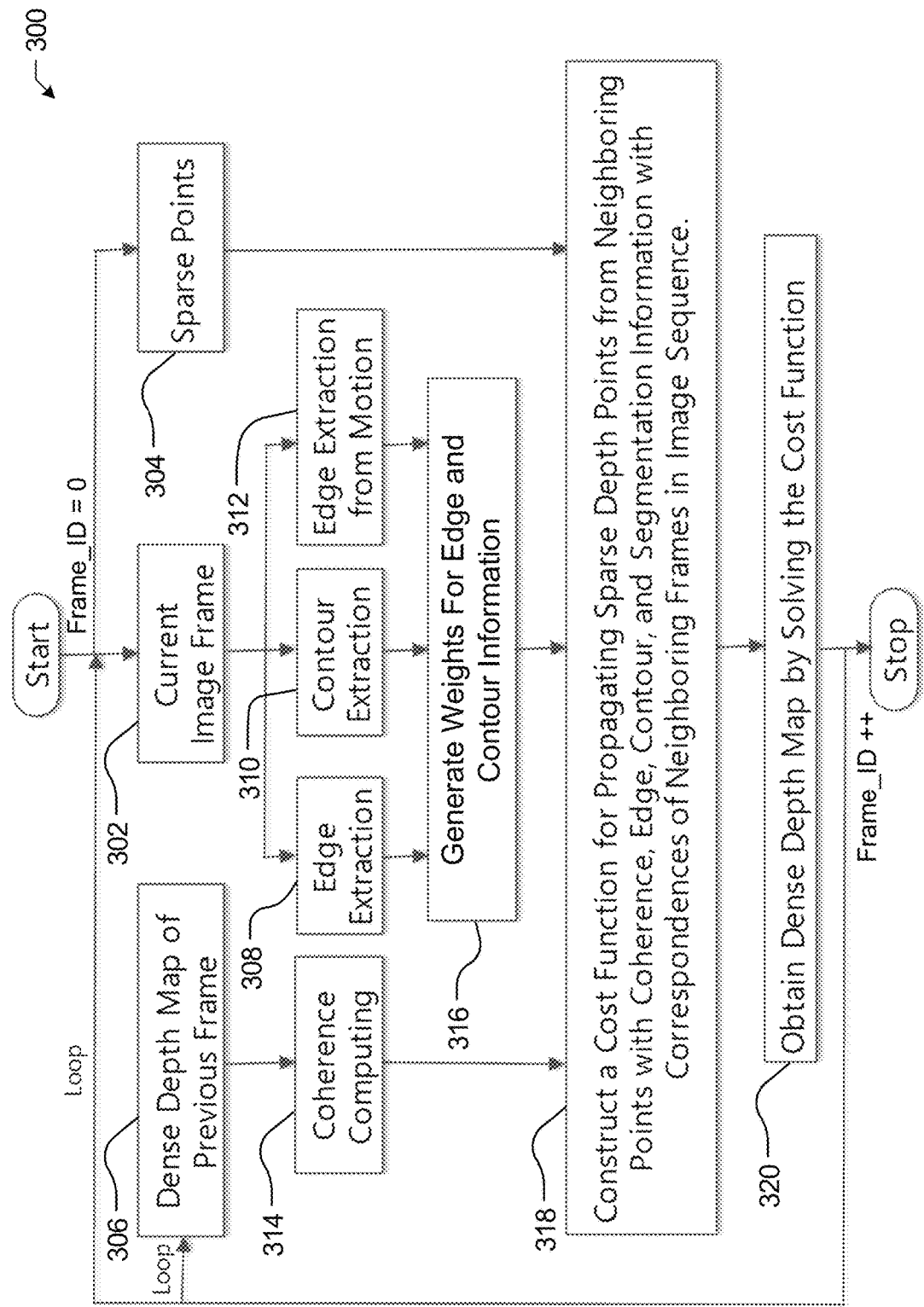
FIG. 3 illustrates a diagram of a workflow process for reconstructing dense depth maps based on sparse depth points and corresponding image frames for providing improved 3D scene reconstruction and comprehension.

FIG. 3 illustrates a diagram of a workflow process 300 for reconstructing dense depth maps based on sparse depth points and corresponding image frames for providing improved 3D scene reconstruction and comprehension, in accordance with the presently disclosed embodiments. In particular embodiments, the workflow process 300 may begin at block 302 and with "Frame_ID=0" with the XR display device 102 accessing a (R)ed, (G)reen, (B)lue current image frame, sparse depth points at block 304, and a dense depth map of an RGB-(D)epth previous image frame at block 306 (e.g., as illustrated by the feedback loop). For example, in particular embodiments, the current image frame and the previous image frame may include, for example, one or more still image data sequences, one or more video data sequences, one or more graphics interchange format (GIF) image data sequences, or other bitmap image data sequence. In particular embodiments, the workflow process 300 may then continue with the XR display device 102 performing, concurrently or sequentially, extraction of static object edge feature points at block 306, extraction of static object contour feature points at block 308, and extraction of dynamic object edge feature points and dynamic object contour feature points at block 310. For example, in particular embodiments, the extractions of the static object edge feature points may be performed on each individual image frame of an image frame sequence, which may include detailed features of 3D objects. In particular embodiments, the XR display device 102 may perform image segmentation to obtain 3D object areas and ranges, which may be then utilized to obtain the object contour feature points. Similarly, in particular embodiments, the extractions of dynamic object edge feature points and dynamic object contour feature points may be performed from video data captured, for example, by one or more cameras of the XR display device 102 while the XR display device 102 moves (e.g., by a user of the XR display device 102 changing her head pose or other movements). For example, in particular embodiments, the dynamic object edge feature points and dynamic object contour feature points may be detected and extracted with coherence of neighboring image frames in the current image frame sequence utilizing, for example, one or more image feature tracking processes.

In particular embodiments, the XR display device 102 may perform depth coherence computation at block 314 based on the dense depth map of an RGB-D previous image frame. For example, in particular embodiments, the XR display device 102 may determine the depth coherence between neighboring image frames with respect to the current image frame sequence based on the dense depth map of an RGB-D previous image frame. In particular embodiments, the XR display device 102 may then generate at block 316 one or more respective weights for the static object edge feature points, static object contour feature points, and dynamic object edge feature points and dynamic object contour feature points. In particular embodiments, the XR display device 102 may then utilize the generated one or more respective weights for the static object edge feature points, static object contour feature points, and dynamic object edge feature points and dynamic object contour feature points and the depth coherence between neighboring image frames with respect to the current image frame sequence to construct a cost function at block 318. In particular embodiments, XR display device 102 may construct the cost function to propagate the sparse depth points corresponding to the current image frame based on, for example, the generated one or more respective weights (e.g., which may be iteratively adjusted to alter one or more effects of different object features) for the static object edge feature points, static object contour feature points, and dynamic object edge feature points and dynamic object contour feature points and the depth coherence between neighboring image frames with respect to the current image frame sequence. For example, in particular embodiments, the XR display device 102 may construct the cost function to reconstruct a dense depth map from the propagated sparse depth points for each pixel of the current image frame.

For example, in particular embodiments, the cost function may be analytically expressed as:

$$\arg\min \text{COST}(depth) = \text{coefficient\_sparse} * \text{sum}(\text{weight\_sparse} * \text{depth\_difference\_sparse}(depth)) + \text{coefficient\_coherence} * \text{sum}(\text{weight\_coherence} * \text{depth\_difference\_coherence}(depth)) + \text{coefficient\_static\_features} * \text{sum}(\text{weight\_static\_features} * \text{depth\_difference\_static\_features}(depth)) + \text{coefficient\_dynamic\_features} * \text{sum}(\text{weight\_dynamic\_features} * \text{depth\_difference\_dynamic\_features}(depth)).$$

In the cost function as analytically expressed above, coefficient_sparse, coefficient_sparse, coefficient_static_features, and coefficient_dynamic_features may represent coefficients that may be utilized for balancing and unifying certain effects of the static object edge feature points, static object contour feature points, and dynamic object edge feature points and dynamic object contour feature points; the depth coherence between neighboring image frames with respect to the current image frame sequence; and the sparse depth points. Referring again to the cost function as analytically expressed above, weight_sparse, weight_sparse, weight_static_features, and weight_dynamic_features may represent the determined weights for determining relative importance or significance with respect to the static object edge feature points, static object contour feature points, and dynamic object edge feature points and dynamic object contour feature points; the depth coherence between neighboring image frames with respect to the current image frame sequence; and the sparse depth points. Lastly, in the cost function as analytically expressed above, depth_difference_sparse(depth) may represent the depth difference between a current pixel(s) and corresponding sparse depth points(s), depth_difference_coherence (depth) may represent the depth difference between the depth coherence with respect to the current image frame and the depth coherence with respect to the previous image frame, depth_difference_static_features(depth) may represent the depth difference between the current pixel(s) and the corresponding pixel(s) of one or more static features, and depth_difference_dynamic_features(depth) may represent the depth difference between the current pixel(s) and the corresponding pixel(s) of one or more dynamic features.

In particular embodiments, the XR display device 102 may then solve the cost function to generate the dense depth map at block 320 and feedback the dense depth map for subsequent iterations of the workflow process 300. For example, in particular embodiments, the XR display device 102 may solve the cost function utilizing, for example, a full multigrid (FMG) solver, a geometric multigrid (GMG) solver, an algebraic multigrid (AMG) solver, or other solver that may provide a solution to the cost function that is both computationally inexpensive and has a reduced processing time (e.g., as compared to conventional techniques). In particular embodiments, the workflow process 300 may be performed iteratively until a dense depth map sequence from an image frame sequence is reconstructed, in which each depth map in the depth map sequence corresponds to a respective image in the image frame sequence. For example, as further depicted by FIG. 3, "Frame_ID++" may indicate the iterative loop through the image frame sequence until the dense depth map sequence is reconstructed. In this way, the present techniques for reconstructing dense depth maps based on sparse depth points and corresponding image frames for providing improved 3D scene reconstruction and comprehension may improve the users' overall XR experience in utilizing the XR display device 102 and associated XR applications. Indeed, by providing the dense depth maps based on sparse depth points and corresponding image frames, the processing times for depth map reconstruction may be reduced and the accuracy and precision of depth map reconstruction (e.g., with respect to improving smoothness and perceptibility of re-projected 3D objects, 3D object boundaries, 3D object edges, 3D object contours, and so forth) may be improved so as to be more suitable for 3D scene reconstruction and comprehension in XR applications.

Figure 4:
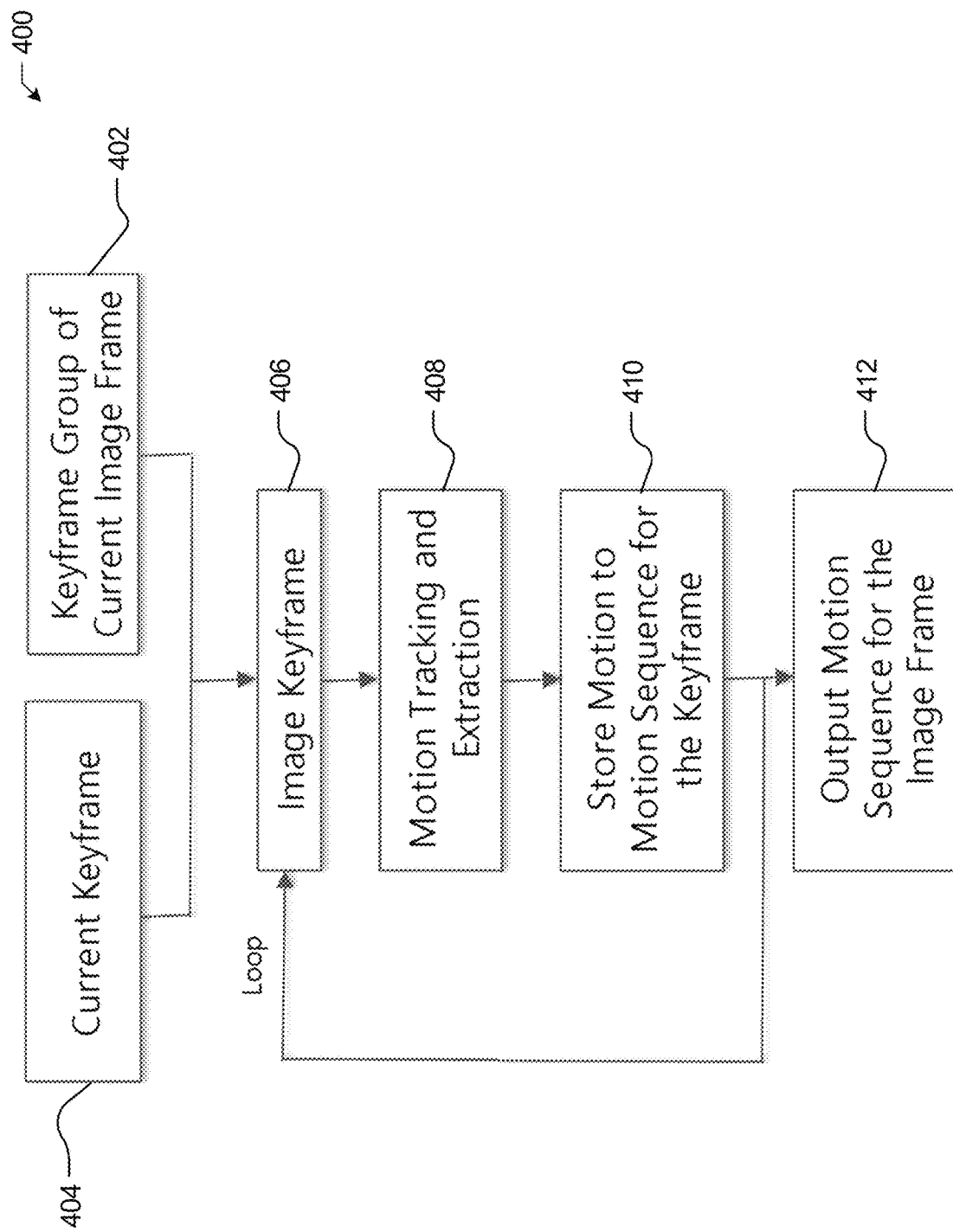
FIG. 4 illustrates a diagram of a workflow process for performing camera tracking and extraction of static object contour feature points and dynamic object contour feature points.

FIG. 4 illustrates a diagram of a workflow process 400 for performing camera tracking and extraction of static object contour feature points and dynamic object contour feature points, in accordance with the presently disclosed embodiments. In particular embodiments, the workflow process 400 may begin at block 402 with the XR display device 102 determining a group of key frames, which may include best possible 3D reconstruction information for the current key frame at block 404. For example, in particular embodiments, the XR display device 102 may perform the workflow process 400 to extract camera motion for each key frame of the group of key frames for the current key frame. In particular embodiments, the XR display device 102 may then determine an image key frame based on the current keyframe and the group of keyframes at block 406. In particular embodiments, the XR display device 102 may then perform camera motion and tracking at block 408. For example, in particular embodiments, for the current key frame, the XR display device 102 may track and extract (e.g., utilizing a gradient based process or optical flow process to compute camera motion of the current frame) camera motion with neighboring frames of the group of key frames. In particular embodiments, the XR display device 102 may store the motion-to-motion sequence for the current key frame at block 410. In particular embodiments, the XR display device 102 may then iteratively loop through blocks 406, 408, and 410 until all key frames of the group of key frames are computed. In particular embodiments, the XR display device 102 may then output a motion sequence for the current image frame corresponding to each key frame of the group of the key frames at block 412.

Figure 5:
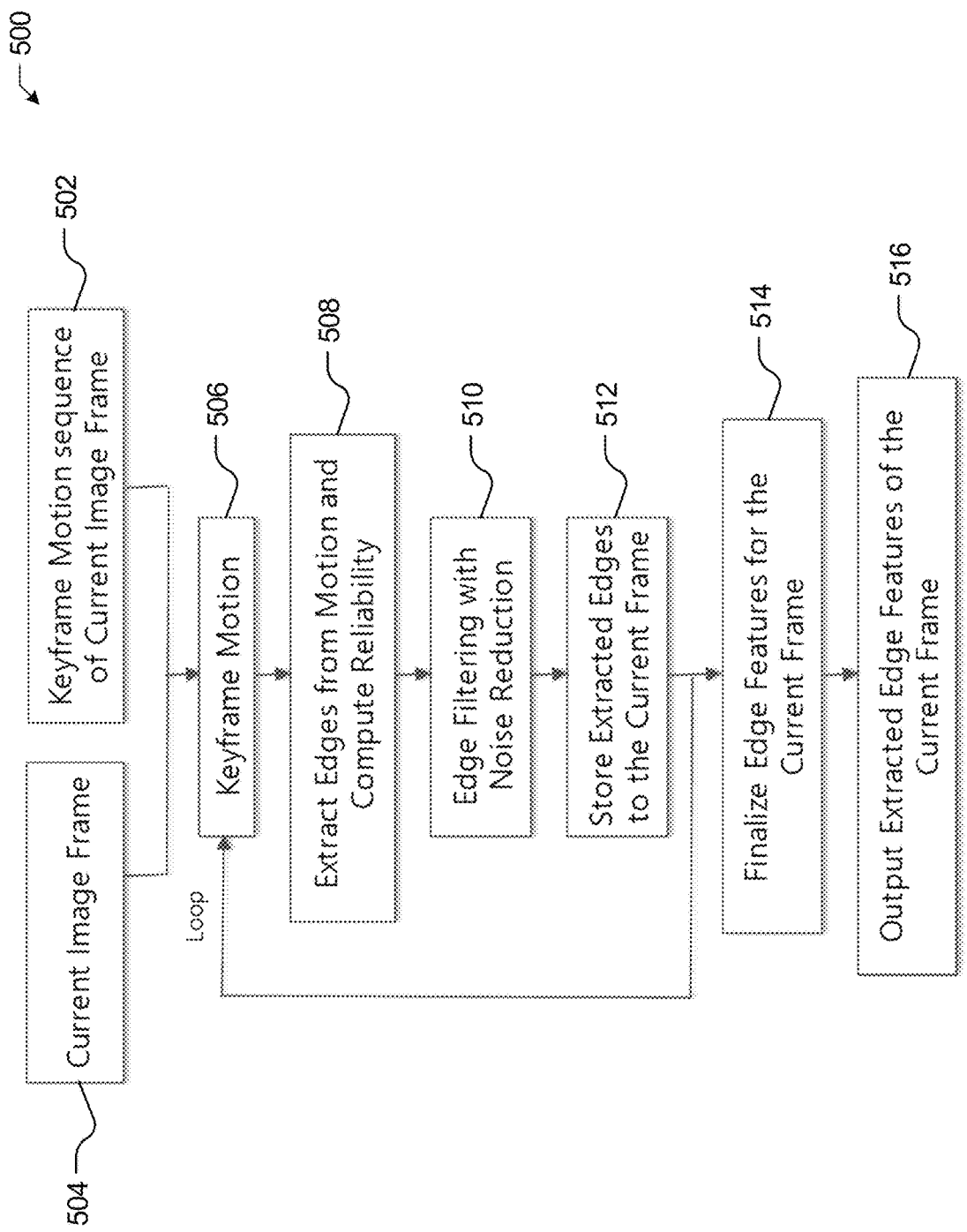
FIG. 5 illustrates a diagram of a workflow process for performing image edge extraction from motion.

FIG. 5 illustrates a diagram of a workflow process 500 for performing image edge extraction from motion, in accordance with the presently disclosed embodiments. In particular embodiments, the workflow process 500 may begin at block 502 with the XR display device 102 determining a motion sequence for a group of key frames for the current key frame at block 504. In particular embodiments, the XR display device 102 may then determine a key frame motion based on the key frame motion sequence and current image frame at block 506. For example, in particular embodiments, the XR display device 102 may determine camera motion with image features and gradients, in which the edges and boundaries of 3D objects may be can be expressed, for example, as magnitudes of gradients. In particular embodiments, the XR display device 102 may then extract edges and boundaries of objects from the motion sequence and compute reliabilities for the extracted edges and boundaries at block 508.

For example, in particular embodiments, the XR display device 102 may utilize magnitudes of the edges and boundaries of objects to represent the reliabilities, which may, for example, indicate a confidence score for the edges and boundaries of objects. In particular embodiments, the XR display device 102 may then perform edge filtering and noise reduction at block 510 to filter out any false positive edges or "weak" edges (e.g., edges having a lower confidence score) from the "strong" edges (e.g., edges having a higher confidence score). In particular embodiments, the XR display device 102 may then store the extracted edges and boundaries for the current image frame at block 512. In particular embodiments, the XR display device 102 may then iteratively loop through blocks 506, 508, 510, and 512 with another key frame motion of the key frame motion sequence until edges and boundaries are extracted for all motion frames in the motion sequence. In particular embodiments, the XR display device 102 may then finalize the edges and boundaries extracted for the current key frame together with the reliabilities (e.g., corresponding to "strong" edges having a higher confidence score) at block 514. In particular embodiments, the XR display device 102 may then output the extracted edges and boundaries extracted for the current image frame at block 516.

Figure 6A:
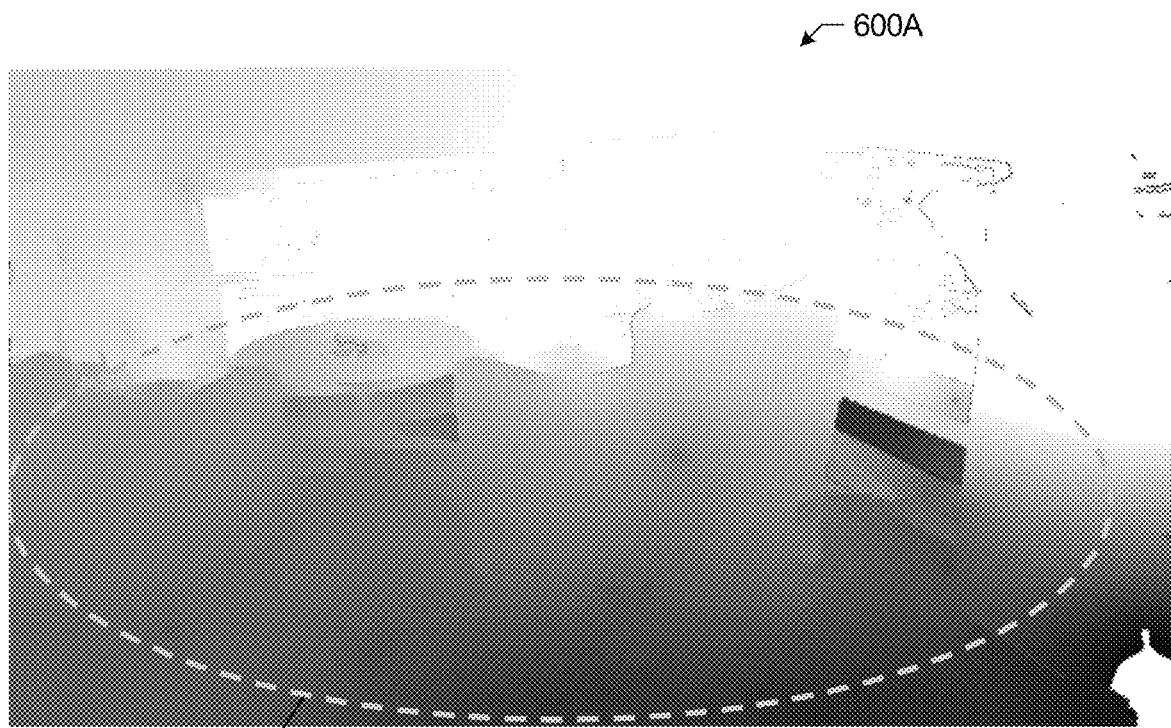
FIGS. 6A and 6B illustrate a first example depth map of a real-world scene and a second example depth map of the real-world scene, respectively.
Figure 6B:
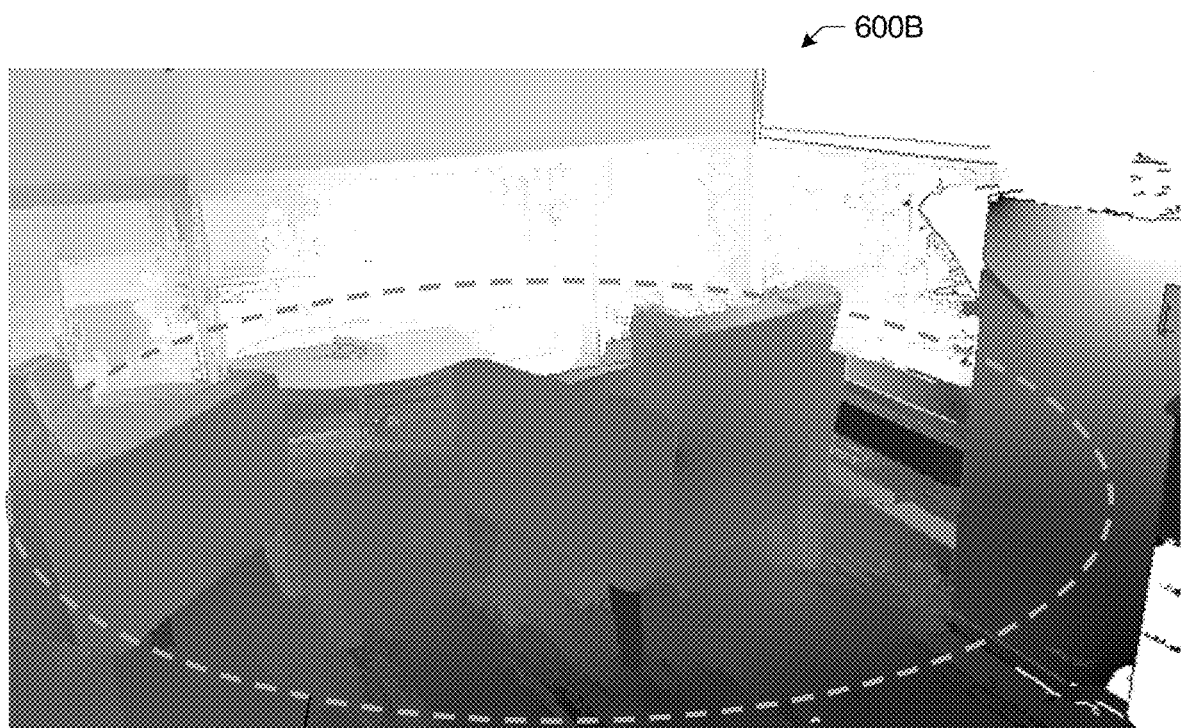

FIGS. 6A and 6B illustrate a first example depth map 600A of a real-world scene (e.g., indoor office room) and a second example depth map 600B of the real-world scene, respectively. In particular embodiments, the first example depth map 600A may correspond to a depth map generated utilizing conventional depth map reconstruction techniques. In contrast, the second example depth map 600B may correspond to a dense depth map generated utilizing the present embodiments for reconstructing dense depth maps based on sparse depth points and corresponding image frames for providing improved 3D scene reconstruction and comprehension. As can be observed, the 3D objects (e.g., as generally highlighted by the dashed circle 602) of the conventional depth map 600A may be rendered with the pixels corresponding to the boundaries and edges of the objects (e.g., seating chairs, table) appearing blurred or washed out. On the other hand, as can be further observed, the 3D objects (e.g., as generally highlighted by the dashed circle 604) of the depth map 600B may be rendered with the pixels corresponding to the boundaries and edges of the objects (e.g., seating chairs, table) appearing smooth and with increased accuracy and perceptibility, in accordance with the presently disclosed embodiments.

Figure 7:
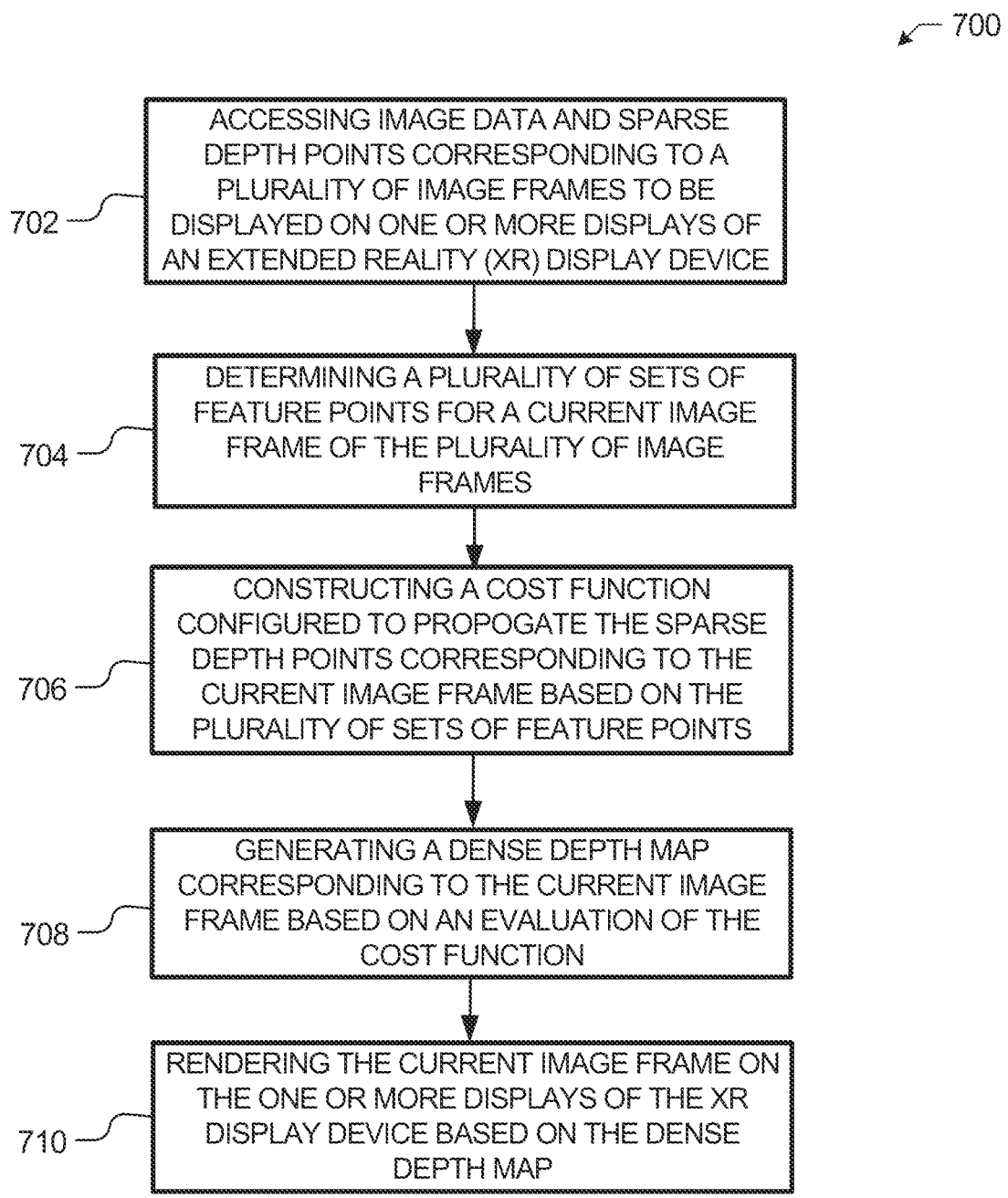
FIG. 7 illustrates is a flow diagram of a method for reconstructing dense depth maps based on sparse depth points and corresponding image frames for providing improved 3D scene reconstruction and comprehension.

FIG. 7 illustrates is a flow diagram of a method 700 for reconstructing dense depth maps based on sparse depth points and corresponding image frames for providing improved 3D scene reconstruction and comprehension, in accordance with the presently disclosed embodiments. The method 700 may be performed utilizing one or more processing devices (e.g., computing device 106) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 700 may begin block 702 with the one or more processing devices (e.g., XR display device 102) accessing image data and sparse depth points corresponding to a plurality of image frames to be displayed on one or more displays of the XR display device. The method 700 may then continue at block 704 with the one or more processing devices (e.g., XR display device 102) determining a plurality of sets of feature points for a current image frame of the plurality of image frames. The method 700 may then continue at block 706 with the one or more processing devices (e.g., XR display device 102) constructing a cost function configured to propagate the sparse depth points corresponding to the current image frame based on the plurality of sets of feature points. The method 700 may then continue at block 708 with the one or more processing devices (e.g., XR display device 102) generating a dense depth map corresponding to the current image frame based on an evaluation of the cost function. The method 700 may then conclude at block 710 with the one or more processing devices (e.g., XR display device 102) rendering the current image frame on the one or more displays of the XR display device based on the dense depth map.

In this way, the present techniques for reconstructing dense depth maps based on sparse depth points and corresponding image frames for providing improved 3D scene reconstruction and comprehension capabilities of XR display devices may improve the users' overall experience in utilizing XR display devices and XR applications. Indeed, by providing the dense depth maps based on sparse depth points and corresponding image frames, the processing times for depth map reconstruction may be reduced and the accuracy and precision of depth map reconstruction (e.g., with respect to improving smoothness and perceptibility of re-projected 3D objects, 3D object boundaries, 3D object edges, 3D object contours, and so forth) may be improved so as to be more suitable for 3D scene reconstruction and comprehension in XR applications.

Figure 8:
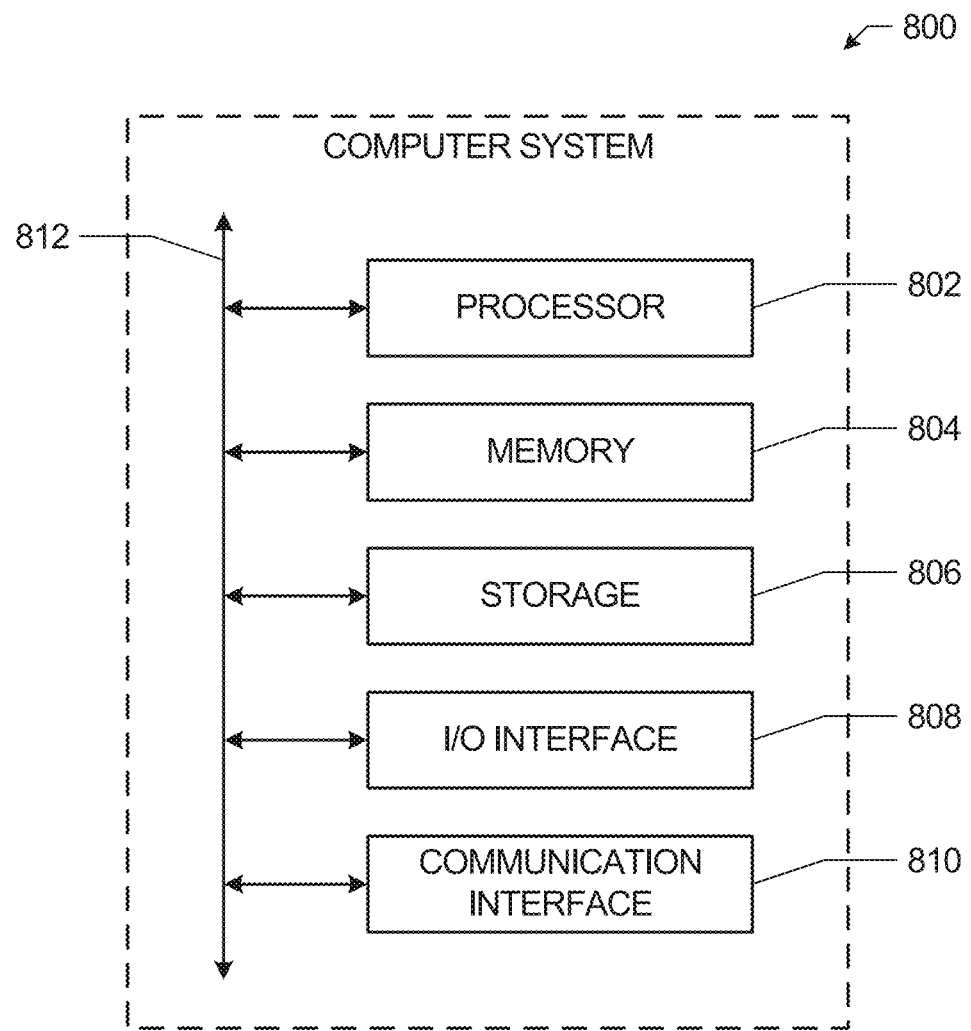
FIG. 8 illustrates an example computer system.

FIG. 8 illustrates an example computer system 800 that may be utilized for reconstructing dense depth maps based on sparse depth points and corresponding image frames for providing improved 3D scene reconstruction and comprehension, in accordance with the presently disclosed embodiments. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks.

Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802.

Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere).

One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 806 for them. Where appropriate, I/O interface 808 may include one or more device or software drivers enabling processor 802 to drive one or more of these I/O devices. I/O interface 808 may include one or more I/O interfaces 806, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example, and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However, any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an extended reality (XR) display device:
    accessing image data and sparse depth points corresponding to a plurality of image frames to be displayed on one or more displays of the XR display device;
    determining a plurality of sets of feature points for a current image frame of the plurality of image frames;
    constructing a cost function configured to propagate the sparse depth points corresponding to the current image frame based on the plurality of sets of feature points;
    generating a dense depth map corresponding to the current image frame based on an evaluation of the cost function; and
    rendering the current image frame on the one or more displays of the XR display device based on the dense depth map.

2. The method of claim 1, wherein the plurality of sets of feature points comprises a set of static edge feature points, a set of dynamic edge feature points, and a set of object contour feature points.

3. The method of claim 2, wherein the plurality of sets of feature points further comprises one or more of a set of static object feature points, a set of dynamic object feature points, a set of static object contour points, or a set of dynamic object contour points.

4. The method of claim 1, further comprising:
    prior to constructing the cost function, determining one or more weights respectively corresponding to the plurality of sets of feature points.

5. The method of claim 4, further comprising:
    constructing the cost function based on the determined one or more weights, the sparse depth points, and a depth coherence between neighboring image frames with respect to the plurality of image frames.

6. The method of claim 5, wherein the depth coherence between neighboring image frames with respect to the plurality of image frames is determined based on a dense depth map corresponding to a previous image frame of the plurality of image frames, and wherein the previous image frame was previously displayed on the one or more displays of the XR display device.

7. The method of claim 1, wherein the dense depth map is generated utilizing one or more linear solvers to determine depth points corresponding to each of a plurality of pixels of the current image frame.

8. The method of claim 7, wherein the one or more linear solvers comprise one or more of a full multigrid (FMG) solver, a geometric multigrid (GMG) solver, or an algebraic multigrid (AMG) solver.

9. An extended reality (XR) display device, comprising:
one or more displays;
one or more non-transitory computer-readable storage media including instructions; and
one or more processors coupled to the display and the storage media, the one or more processors configured to execute the instructions to:
   access image data and sparse depth points corresponding to a plurality of image frames to be displayed on the one or more displays of the XR display device;
   determine a plurality of sets of feature points for a current image frame of the plurality of image frames;
   construct a cost function configured to propagate the sparse depth points corresponding to the current image frame based on the plurality of sets of feature points;
   generate a dense depth map corresponding to the current image frame based on an evaluation of the cost function; and
   render the current image frame on the one or more displays of the XR display device based on the dense depth map.

10. The XR display device of claim 9, wherein the plurality of sets of feature points comprises a set of static edge feature points, a set of dynamic edge feature points, and a set of object contour feature points.

11. The XR display device of claim 9, wherein the instructions further comprise instructions to:
prior to constructing the cost function, determine one or more weights respectively corresponding to the plurality of sets of feature points.

12. The XR display device of claim 11, wherein the instructions further comprise instructions to construct the cost function based on the determined one or more weights, the sparse depth points, and a depth coherence between neighboring image frames with respect to the plurality of image frames.

13. The XR display device of claim 12, wherein the depth coherence between neighboring image frames with respect to the plurality of image frames is determined based on a dense depth map corresponding to a previous image frame of the plurality of image frames, and wherein the previous image frame was previously displayed on the one or more displays of the XR display device.

14. The XR display device of claim 9, wherein the dense depth map is generated utilizing one or more linear solvers to determine depth points corresponding to each of a plurality of pixels of the current image frame.

15. The XR display device of claim 14, wherein the one or more linear solvers comprise one or more of a full multigrid (FMG) solver, a geometric multigrid (GMG) solver, or an algebraic multigrid (AMG) solver.

16. A non-transitory computer-readable medium comprising instructions that, when executed by one or more processors of an extended reality (XR) display device, cause the one or more processors to:
   access image data and sparse depth points corresponding to a plurality of image frames to be displayed on one or more displays of the XR display device;
   determine a plurality of sets of feature points for a current image frame of the plurality of image frames;
   construct a cost function configured to propagate the sparse depth points corresponding to the current image frame based on the plurality of sets of feature points;
   generate a dense depth map corresponding to the current image frame based on an evaluation of the cost function; and
   render the current image frame on the one or more displays of the XR display device based on the dense depth map.

17. The non-transitory computer-readable medium of claim 16, wherein the plurality of sets of feature points comprises a set of static edge feature points, a set of dynamic edge feature points, and a set of object contour feature points.

18. The non-transitory computer-readable medium of claim 16, wherein the instructions further comprise instructions to:
prior to constructing the cost function, determine one or more weights respectively corresponding to the plurality of sets of feature points.

19. The non-transitory computer-readable medium of claim 18, wherein the instructions further comprise instructions to construct the cost function based on the determined one or more weights, the sparse depth points, and a depth coherence between neighboring image frames with respect to the plurality of image frames.

20. The non-transitory computer-readable medium of claim 19, wherein the depth coherence between neighboring image frames with respect to the plurality of image frames is determined based on a dense depth map corresponding to a previous image frame of the plurality of image frames, and wherein the previous image frame was previously displayed on the one or more displays of the XR display device.

* * * * *